United States Patent
Lee et al.

(10) Patent No.: US 8,338,019 B2
(45) Date of Patent: Dec. 25, 2012

(54) SEPARATOR HAVING POROUS COATING LAYER AND ELECTROCHEMICAL DEVICE CONTAINING THE SAME

(75) Inventors: Sang-Young Lee, Daejeon (KR); Pil-Kyu Park, Daejeon (KR); Jong-Hun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/329,966

(22) Filed: Dec. 19, 2011

(65) Prior Publication Data

US 2012/0088144 A1    Apr. 12, 2012

Related U.S. Application Data

(63) Continuation of application No. 12/743,464, filed as application No. PCT/KR2008/006780 on Nov. 18, 2008.

(30) Foreign Application Priority Data

Nov. 19, 2007    (KR) .................. 10-2007-0117996

(51) Int. Cl.
- *H01M 2/16* (2006.01)
- *H01M 10/40* (2006.01)

(52) U.S. Cl. ......... 429/144; 429/129; 429/145; 429/247

(58) Field of Classification Search ................ None
See application file for complete search history.

(56) References Cited

U.S. PATENT DOCUMENTS

| | | | |
|---|---|---|---|
| 5,595,841 A | 1/1997 | Suzuki | |
| 6,756,153 B1 | 6/2004 | Yamamoto et al. | |
| 7,662,517 B2 | 2/2010 | Lee et al. | |
| 7,682,740 B2 * | 3/2010 | Yong et al. | 429/217 |
| 7,704,641 B2 * | 4/2010 | Yong et al. | 429/251 |
| 8,168,332 B2 * | 5/2012 | Bae et al. | 429/251 |
| 2002/0034686 A1 | 3/2002 | Yamakawa et al. | |

(Continued)

FOREIGN PATENT DOCUMENTS

JP    2005-268095 A    9/2005

(Continued)

OTHER PUBLICATIONS

Extended European Search Report, dated Sep. 30, 2010, for European Application No. 08851676.0.

(Continued)

*Primary Examiner* — John S Maples (74) *Attorney, Agent, or Firm* — Birch, Stewart, Kolasch & Birch, LLP (57) ABSTRACT

A separator includes a porous substrate having a plurality of pores, and a porous coating layer formed on at least one surface of the porous substrate and made of a mixture of a plurality of filler particles and a binder polymer. The filler particles include electrode active material particles that are electrochemically oxidized and reduced. The binder polymer includes a copolymer having (a) a first monomer unit with a contact angle to water of 0 to 49° and (b) a second monomer unit with a contact angle to water of 50 to 130°. This separator is useful for an electrochemical device, particularly a lithium secondary battery. This separator ensures improved thermal stability and increased capacity of the electrochemical device. Also, inorganic particles in the porous coating layer formed on the porous substrate are not disintercalated due to excellent peeling resistance of the porous coating layer while the electrochemical is assembled.

44 Claims, 1 Drawing Sheet

U.S. PATENT DOCUMENTS

| | | | |
|---|---|---|---|
| 2007/0264577 A1* | 11/2007 | Katayama et al. | 429/246 |
| 2009/0111025 A1 | 4/2009 | Lee et al. | |
| 2009/0155678 A1* | 6/2009 | Less et al. | 429/144 |

FOREIGN PATENT DOCUMENTS

| | | |
|---|---|---|
| JP | 2006-164761 A | 6/2006 |
| KR | 10-2005-0121116 A | 12/2005 |
| KR | 10-2006-0072065 A | 6/2006 |
| KR | 10-2007-0000231 B1 | 1/2007 |
| KR | 10-2007-0005341 A | 1/2007 |
| WO | WO 2006/068428 A1 | 6/2006 |

OTHER PUBLICATIONS

PCT Written Opinion of the International Searching Authority, Appl. No. PCT/KR2008/006780, May 20, 2009.

* cited by examiner

SEPARATOR HAVING POROUS COATING LAYER AND ELECTROCHEMICAL DEVICE CONTAINING THE SAME

This application is a Continuation of U.S. patent application Ser. No. 12/743,464, filed May 18, 2010, which is the U.S. National Stage of PCT/KR2008/006780 filed on Nov. 18, 2008. This application also claims priority to Korean Application No. 10-2007-0117996, filed Nov. 19, 2007. The entire contents of the above-mentioned applications are hereby incorporated by reference.

TECHNICAL FIELD

The present invention relates to a separator used for an electrochemical device such as a lithium secondary battery and an electrochemical device having the same. More particularly, the present invention relates to a separator in which a porous coating layer made of a mixture of a binder polymer and filler particles is formed on the surface of a porous substrate, and an electrochemical containing the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, in the development of such batteries, designs of new electrodes and batteries to improve capacity density and specific energy are mainly studied.

Among currently used secondary batteries, lithium secondary batteries developed in early 1990's have a higher drive voltage and a much higher energy density than those of conventional batteries using a liquid electrolyte solution such as Ni-MH batteries, Ni—Cd batteries, and $H_2SO_4$—Pb batteries. For these reasons, the lithium secondary batteries have been advantageously used. However, such a lithium secondary battery has disadvantages in that organic electrolytes used therein may cause safety-related problems such as ignition and explosion of the batteries and that processes for manufacturing such a battery are complicated. Recently, lithium-ion polymer batteries have been considered as one of the next-generation batteries since the above disadvantages of the lithium ion batteries are solved. However, the lithium-ion polymer batteries have a relatively lower battery capacity than those of the lithium ion batteries and an insufficient discharging capacity at low temperature, and therefore these disadvantages of the lithium-ion polymer batteries remain to be urgently solved.

Such electrochemical devices have been produced from many companies, and the battery stability has different phases in the electrochemical devices. Accordingly, it is important to ensure the stability of the electrochemical batteries. First of all, it should be considered that errors in operation of the electrochemical device should not cause damage to users. For this purpose, the Safety Regulation strictly regulates ignition and explosion in the electrochemical devices. In the stability characteristics of the electrochemical device, overheating of the electrochemical device may cause thermal runaway, and explosion may occur when a separator is pierced. In particular, a polyolefin porous substrate commonly used as a separator of an electrochemical device shows extreme thermal shrinking behavior at a temperature of 100° C. or above due to the features of its material and its manufacturing process such as elongation, so there may occur an electric short circuit between positive and negative electrodes.

Figure 1:
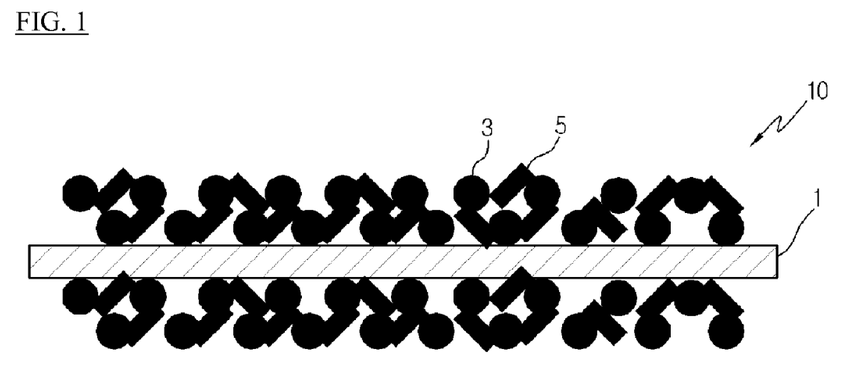
FIG. 1 is a schematic sectional view showing a separator having a porous coating layer formed thereon.

In order to solve the above safety-related problems of the electrochemical device, Korean Laid-open Patent Publication No. 10-2006-72065 and No. 10-2007-231 disclose a separator 10 having a porous coating layer formed by coating at least one surface of a porous substrate 1 having many pores with a mixture of filler particles 3 such as inorganic particles and a binder polymer 5 (see FIG. 1). In the separator 10 having a porous coating layer, the filler particles 3 in the porous coating layer formed on the porous substrate 1 act as a kind of spacer that keeps a physical shape of the porous coating layer, so the filler particles 3 restrain thermal shrinkage of the porous substrate when the electrochemical device is overheated. In addition, interstitial volumes exist among the filler particles, thereby forming fine pores.

As mentioned above, the porous coating layer formed on the porous substrate contributes to the improvement of safety. In the related art, filler particles used for forming a porous coating layer have employed $BaTiO_3$, $Pb(Zr,Ti)O_3$ (PZT), $ZrO_2$, $SiO_2$, $Al_2O_3$, $TiO_2$, lithium phosphate ($Li_3PO_4$) and lithium titanium phosphate ($Li_xTi_y(PO_4)_3$, $0<x<2$, $0<y<3$), but these filler particles does not contribute to improvement of capacity of batteries due to their electrochemical characteristics. Thus, in case a porous coating layer is formed in a porous substrate with a common thickness, the separator is thickened, and an amount of electrode active material particles put into a unit volume is decreased accordingly, so a capacity per cell is decreased.

Meanwhile, in order to control thermal shrinkage of a porous substrate by the porous coating layer formed on the porous substrate, a sufficient amount of filler particles greater than a predetermined content should be contained therein. However, as the content of filler particles is increased, the content of polymer is relatively decreased. Accordingly, the filler particles of the porous coating layer may be disintercalated due to the stress occurring during the assembling process of an electrochemical device such as a taking-up process. The disintercalated filler particles act as a local defect of the electrochemical device, thereby giving a bad influence on the safety of the electrochemical device.

DISCLOSURE OF INVENTION

Technical Problem

The present invention is designed to solve the problems of the prior art, and therefore an object of the invention is to provide a separator capable of improving thermal stability and increasing capacity of a cell by introducing a porous coating layer thereto, and an electrochemical device containing such a separator.

Another object of the present invention is to provide a separator capable of improving stability of an electrochemical device by solving the problem that filler particles in a porous coating layer formed on a porous substrate are disintercalated during an assembling process of the electrochemical device, and an electrochemical device containing such a separator.

Technical Solution

In order to accomplish the first object, the present invention provides a separator including a porous substrate having a plurality of pores; and a porous coating layer formed on at least one surface of the porous substrate and made of a mixture of a plurality of filler particles and a binder polymer, wherein the filler particles include electrode active material particles that are electrochemically oxidized and reduced, and wherein the binder polymer includes a copolymer having (a) a first monomer unit with a contact angle to water of 0 to 49° and (b) a second monomer unit with a contact angle to water of 50 to 130°.

The separator of the present invention uses electrode active material particles electrochemically oxidized and reduced, as the filler particles of the porous coating layer. Accordingly, it is possible to improve thermal stability of the separator due to the introduction of the porous coating layer and to improve capacity decrease of a battery though a porous substrate with a common thickness is used. In addition, the separator of the present invention uses a predetermined copolymer as a binder polymer used for forming the porous coating layer. Accordingly, the peeling resistance of the porous coating layer is improved, so the filler particles in the porous coating layer are not disintercalated during an assembling process of an electrochemical device.

In the separator of the present invention, the filler particles may further include inorganic particles selected from the group consisting of inorganic particles having a dielectric constant of 5 or above and inorganic particles having lithium-ion transferring capability, or their mixtures.

In the separator of the present invention, the first monomer unit is preferably a monomer unit having at least one functional group selected from the group consisting of OH, COOH, MAH (maleic anhydride) and $SO_3H$, and the second monomer unit is preferably a monomer unit having at least one functional group selected from the group consisting of F, Cl, CN, acrylate, acetate and ester.

In the separator of the present invention, the copolymer including the first and second monomer units may be any one copolymer selected from the group consisting of acrylonitrile-maleic anhydride copolymer, acrylonitrile-vinylalcohol copolymer, cyanoethylene-vinylalcohol copolymer, cyanoethylene-cellulose copolymer, cyanoethylene-sucrose copolymer, acrylonitrile-acrylic acid copolymer, acrylonitrile-anhydrous maleic acid copolymer, acrylate-acrylic acid copolymer and acrylate-anhydrous maleic acid copolymer, or their mixtures.

The separator of the present invention may be interposed between positive and negative electrodes, and then electrolyte is injected thereto. In this way, the separator of the present invention ma be used for electrochemical devices such as lithium secondary batteries and super capacitor devices.

Advantageous Effects

The separator according to the present invention gives the following effects.

First, the porous coating layer including electrode active material particles electrochemically oxidized and reduced contributes to increasing battery capacity. Accordingly, though a separator is made by forming the porous coating layer on a porous substrate with a common thickness, it is possible to solve the problem that the capacity per cell is decreased.

Second, during the assembling process of an electrochemical device, inorganic particles in the porous coating layer formed on the porous substrate are not disintercalated.

Third, since the porous coating layer and the porous substrate are adhered with a great force, the porous coating layer may sufficiently exhibit its function to control thermal shrinkage of the porous substrate though an electrochemical device is overheated. Accordingly, it is possible to prevent a short circuit between positive and negative electrodes though the electrochemical device is overheated, thereby greatly improving stability of the electrochemical device.

BEST MODE

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

A separator according to the present invention includes a porous substrate having a plurality of pores; and a porous coating layer formed on at least one surface of the porous substrate and made of a mixture of a plurality of filler particles and a binder polymer. In the present invention, the filler particles employ electrode active material particles that are electrochemically oxidized and reduced.

As mentioned above, filler particles used for forming a conventional porous coating layer, such as $BaTiO_3$, $Pb(Zr,Ti)O_3$ (PZT), $ZrO_2$, $SiO_2$, $Al_2O_3$, $TiO_2$, lithium phosphate ($Li_3PO_4$) and lithium titanium phosphate ($Li_xTi_y(PO_4)_3$, $0<x<2$, $0<y<3$), are not electrochemically oxidized or reduced, so they contribute to improvement of battery capacity not so much. However, if electrode active material particles electrochemically oxidized and reduced are used as filler particles by the content of 1 to 100 weight %, based on the entire weight of the filler particles, as in the present invention, it is possible to improve thermal stability of the separator by the introduction of the porous coating layer and also contrive to increase capacity of a battery. Accordingly, though a separator is made by forming a porous coating layer on a porous substrate with a common thickness, the capacity per cell is not decreased.

In the separator of the present invention, the porous coating layer may be formed on any one surface or both surfaces of the porous substrate. At this time, the electrode active material particles may use positive electrode active materials, negative electrode active materials, or their combinations. Now, actions of the electrode active material particles contained in the porous coating layer are explained in more detail.

Positive electrode active material particles contained in a porous coating layer to face a positive electrode contribute to increase of capacity of the positive electrode, and negative electrode active material particles contained in a porous coating layer to face a negative electrode contribute to increase of capacity of the negative electrode. Meanwhile, negative electrode active material particles contained in the porous coating layer to face a positive electrode do not contribute to increase of capacity of the positive and negative electrodes, and they just play a role of filler particles. On the contrary, positive electrode active material particles contained in the porous coating layer to face a negative electrode do not contribute to increase of capacity of both negative and positive electrodes, but they just play a role of filler particles.

Thus, in case it is intended to increase capacity of only a positive electrode, it is desirable that a porous coating layer containing only positive electrode active material particles as electrode active material particles is formed on only one surface of the porous substrate to face a positive electrode. Also, in case it is intended to increase capacity of only a negative electrode, it is desirable that a porous coating layer containing only negative electrode active material particles as electrode active material particles is formed on only one surface of the porous substrate to face a negative electrode. In addition, in case it is intended to increase capacities of both positive and negative electrodes, it is desirable that a porous coating layer containing only positive electrode active material particles is formed on one surface of the porous substrate to face a positive electrode, and a porous coating layer containing only negative electrode active material particles is formed on the other surface of the porous substrate to face a negative electrode.

However, in case porous coating layers are formed on both surfaces of a porous substrate using dip coating in consideration of productivity, the porous coating layers may also be formed in the following ways.

First, in case it is intended to increase capacity of a positive electrode, porous coating layers containing only positive electrode active material particles as electrode active material particles may be formed on both surfaces of the porous substrate.

Second, in case it is intended to increase capacity of only a negative electrode, porous coating layers containing only negative electrode active material particles as electrode active material particles may be formed on both surfaces of the porous substrate.

Third, in case it is intended to increase capacities of both positive and negative electrodes, porous coating layers containing both positive and negative electrode active material particles as electrode active material particles may be formed on both surfaces of the porous substrate.

The above electrode active material particles may employ common electrode active material particles with no special limitation if they may be electrochemically oxidized and reduced. Among the electrode active material particles, the positive electrode active material particle may be any positive electrode active material particle commonly used in positive electrodes of conventional electrochemical devices, for example $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are independently any one selected from the group consisting of Al, Ni, Co, Fe, Mn, V, Cr, Ti, W, Ta, Mg and Mo, and x, y and z are independently atomic fractions of component elements of oxides, where $0 \leq x<0.5$, $0 \leq y<0.5$, $0 \leq z<0.5$), or their mixtures. In addition, among the electrode active material particles, the negative electrode active material particle may be any negative electrode active material particle commonly used in negative electrodes of conventional electrochemical devices, for example natural graphite, artificial graphite, carbonaceous material, LTO (lithium titanium oxide), silicon (Si) and tin (Sn), or their mixtures.

In the separator of the present invention, in addition to the electrode active material particles, the filler may further include inorganic particles commonly used as filler particles, namely an inorganic particle that does not cause oxidation or reduction reaction in an operating voltage range (for example, 0 to 5V based on $Li/Li^+$) of an electrochemical device. In particular, in case an inorganic particle with ion transferring capability is used, it is possible to enhance the performance of the electrochemical device by increasing ion conductivity. In addition, in case an inorganic particle with a high dielectric constant is used, it contributes to the increase of dissociation of electrolyte salt, for example lithium salt, in the liquid electrolyte, thereby improving ion conductivity of the electrolyte.

Due to the above reasons, it is preferred that the inorganic particles may include inorganic particles having a dielectric constant of 5 or above, preferably 10 or above, inorganic particles having lithium-ion transferring capability, or their mixtures. The inorganic particle having a dielectric constant of 5 or above may be for example $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN—PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, and their mixtures, but not limitedly.

In particular, the inorganic particles such as of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT) and hafnia ($HfO_2$) show a high dielectric constant of 100 or above and have piezoelectricity since charges are generated to make a potential difference between both surfaces when a certain pressure is applied thereto to extend or shrink them, so the above inorganic particles may prevent generation of an internal short circuit of both electrodes caused by an external impact and thus further improve the safety of the electrochemical device. In addition, in case the inorganic particles having a high dielectric constant are mixed with the inorganic particles having lithium ion transferring capability, their synergistic effect may be doubled.

In the present invention, the inorganic particle having lithium ion transferring capability means an inorganic particle containing lithium atom and having a function of moving a lithium ion without storing the lithium. The inorganic particle having lithium ion transferring capability may transfer and move lithium ions due to a kind of defect existing in the particle structure, so it is possible to improve lithium ion conductivity in the battery and also improve the performance of the battery. The inorganic particle having lithium ion transferring capability may be lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as LiI—$Li_2S$—$P_2S_5$, or their mixtures, but not limitedly.

Also, the filler particles may include carbonaceous material with an electric conductivity of 1 mS/cm or above.

In the separator according to the present invention, the size of filler particles in the porous coating layer is not specially limited, but the particle size is preferably 0.001 to 10 μm in order to form a coating layer with a uniform thickness and ensure suitable porosity. If the particle size is less than 0.001 μm, a dispersing property of filler particles may be deteriorated. If the particle size exceeds 10 μm, the thickness of the porous coating layer is increased, which may deteriorate mechanical properties. Also, an excessively great pore size may increase the possibility of internal short circuit while a battery is charged or discharged.

A ratio of the filler particles to the binder polymer in the porous coating layer formed on the porous substrate according to the present invention is preferably 50:50 to 99:1, more preferably from 70:30 to 95:5. If the ratio of the filler particles to the binder polymer is less than 50:50, the content of polymer is so great that the thermal stability of the separator may be not much improved. In addition, pore size and porosity may be decreased due to the decrease of interstitial volume formed among the filler particles, thereby causing deterioration of the performance of a final battery. If the content of filler particles exceeds 99 parts by weight, the peeling resistance of the porous coating layer may be weakened since the content of binder polymer is so small. The thickness of the porous coating layer composed of the filler particles and the binder polymer is not specially limited but is preferably 0.01 to 20 µm. Also, pore size and porosity are not specially limited, but the pore size is preferably 0.001 to 10 µm and the porosity is preferably 10 to 90%. The pore size and porosity are mainly dependent on the size of filler particles. For example, in case filler particles have a diameter of 1 µm or less, the formed pore is also approximately 1 µm or less. The pores as mentioned above are filled with electrolyte injected later, and the filled electrolyte plays a role of transferring ions. In case the pore size and porosity are respectively less than 0.001 µm and 10%, the porous coating layer may act as a resistance layer. In case the pore size and porosity are respectively greater than 10 µm and 90%, mechanical properties may be deteriorated.

In addition, as the binder polymer for forming a porous coating layer, the separator of the present invention uses a copolymer having (a) a first monomer unit with a contact angle to water of 0 to 49° and (b) a second monomer unit with a contact angle to water of 50 to 130°.

This copolymer may be expressed as (first monomer unit)$_m$–(second monomer unit)$_n$(0<m<1, 0<n<1), and it may adopt any kind of copolymer such as random copolymers and block copolymers if it may have a first monomer unit and a second monomer unit. A mole ratio of the first monomer unit is preferably 1 to 20 mol %, based on the entire copolymer. Also, the contact angle to water of the entire copolymer is preferably 5 to 100°. This copolymer may further include another monomer unit if it does not obstruct the purpose of the present invention. In addition, the binder polymer may be mixed with another kind of binder polymer in addition to the above copolymers if it does not obstruct the purpose of the present invention, as apparent to those having ordinary skill in the art.

In the present invention, after a sample film was made using a single polymer of a corresponding monomer, a distilled water drop was dropped thereon such that a formed contact angle is set to 23°, and then the contact angle to water was measured using a contact angle measurer model CA-DT-A (mfd., produced by Kyowa Kaimen Kagaku KK) under the RH condition of 50%. Contact angle was measured at two points (left and right points) of each of three sample films, and then six measured values were averaged into a contact value. The distilled water drop had a diameter of 2 mm, and the value of the contact angle exhibited on the measurer was measured 1 minute after the distilled water drop was dropped.

Among the monomer units of the copolymer, the first monomer unit having a contact angle to water of 0 to 49°, preferably 5 to 30°, has a relatively greater hydrophile property than the second monomer unit, so the first monomer unit contributes to improvement of adhesion among the filler particles. Also, the second monomer unit having a contact angle to water of 50 to 130°, preferably 70 to 120°, has a relatively greater hydrophobic property than the first monomer unit, so the second monomer unit contributes to improvement of adhesion between the filler particles and the porous substrate. Thus, when the above copolymer is used as a binder polymer of the porous coating layer, peeling resistance of the porous coating layer may be increased rather than the case using a conventional binder polymer. Accordingly, it is possible to lower the content of the binder polymer and increase the content of the filler particles in the porous coating layer, so thermal shrinkage of the porous substrate may be further controlled. Also, porosity of the porous coating layer is increased, which contributes to improvement of performance of the electrochemical device. In addition, since the adhesive force between the porous coating layer and the porous substrate is strong, the function of the porous coating layer to control thermal shrinkage of the porous substrate is sufficiently exhibited though the electrochemical device is overheated. Accordingly, the safety of the electrochemical device is greatly improved.

In the separator of the present invention, the peeling force of the porous coating layer is preferably 5 gf/cm or above, in aspect of solving the problem that filler particles in the porous coating layer are disintercalated during the assembling process of the electrochemical device.

In the separator of the present invention, the first monomer unit is preferably a monomer unit having at least one functional group selected from the group consisting of OH, COOH, MAH (maleic anhydride) and SO$_3$H, and the second monomer unit is preferably a monomer unit having at least one functional group selected from the group consisting of F, Cl, CN, acrylate, acetate and ester.

The copolymer including the above first and second monomer units may be at least one copolymer selected from the group consisting of acrylonitrile-maleic anhydride copolymer, acrylonitrile-vinylalcohol copolymer, cyanoethylene-vinylalcohol copolymer, cyanoethylene-cellulose copolymer, cyanoethylene-sucrose copolymer, acrylonitrile-acrylic acid copolymer, acrylonitrile-anhydrous maleic acid copolymer, acrylate-acrylic acid copolymer and acrylate-anhydrous maleic acid copolymer, or their mixtures.

In the separator of the present invention, other additives such as conductive material may be further included in addition to the filler particles and the binder polymer together with electrode active material particles explained as components of the porous coating layer.

In addition, in the separator of the present invention, the porous substrate having a plurality of pores may use any porous substrate commonly used for electrochemical devices. The porous substrate may be a membrane or a non-woven fabric formed using any one polymer such as HDPE (high density polyethylene), LDPE (low density polyethylene), LLDPE (linear low density polyethylene, UHMWPE (ultra high molecular weight polyethylene), polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro and polyethylenenaphthalene, or their mixtures.

Thickness of the porous substrate is not specially limited, but preferably 1 to 100 µm, more preferably 5 to 50 µm. Pore size and porosity in the porous substrate are also not specially limited, but preferably 0.01 to 50 µm and 10 to 95%, respectively.

The separator having a porous coating layer with electrode active particles according to the present invention may be manufactured in a common way, and a preferable example is explained below, but the present invention is not limited thereto.

First, a copolymer including the first and second monomer units with the above contact angles to water is dissolved in a solvent to make a binder polymer solution.

Subsequently, filler particles are added to the binder polymer solution and dispersed therein. The solvent preferably has a solubility parameter similar to that of the used binder polymer and a low boiling point. It will help uniform mixture and easy removal of the solvent afterward. Non-limiting examples of usable solvents include acetone, tetrahydrofuran, methylene chloride, chloroform, dimethylformamide, N-methyl-2-pyrrolidone (NMP), cyclohexane, and water, or their mixtures. It is preferred that the filler particles are pulverized after being added to the binder polymer solution. At this time, the time required for pulverization is suitably 1 to 20 hours, and the particle size of the pulverized particles is preferably 0.001 and 10 μm, as mentioned above. Conventional pulverization methods may be used, and a method using a ball mill is particularly preferred.

After that, a porous substrate is coated with the binder polymer solution in which the filler particles are dispersed, under the humidity condition of 10 to 80%, and then dried.

In order to coat the porous substrate with the binder polymer solution in which the filler particles are dispersed, common coating methods well known in the art may be used. For example, various methods such as dip coating, die coating, roll coating, comma coating or their combinations may be used.

The separator prepared as mentioned above according to the present invention may be used as a separator of an electrochemical device, which is interposed between positive and negative electrodes. At this time, in case a polymer that is gellable at swelling in liquid electrolyte is used as a binder polymer component, after a battery is assembled, the injected electrolyte and the binder polymer may be reacted and then gelated, thereby forming a gel-type composite electrolyte.

The electrochemical device may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries such as a lithium metal secondary battery, a lithium ion secondary battery, a lithium polymer secondary battery or a lithium ion polymer secondary battery are preferred.

The electrochemical device may be made according to common methods well known in the art. For example, the electrochemical device may be made by interposing the above separator between positive and negative electrodes, and then injecting an electrolyte therein.

There is no special limitation in the electrodes that may be used together with the separator of the present invention, and the electrode may be manufactured by coating a current collector with electrode active material slurry according to one of common methods well known in the art. Positive electrode active material and negative electrode active material used for the electrode may adopt common electrode active materials useable in positive and negative electrodes of a conventional electrochemical device, and their specific examples are already explained above.

The electrolyte solution useable in the present invention includes a salt represented by the formula of $A^+B^-$, wherein $A^+$ represents an alkali metal cation such as $Li^+$, $Na^+$, $K^+$ or their combinations, and $B^-$ represents an salt containing an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or their combinations. The salt may be dissolved or dissociated in an organic solvent composed of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone), or their mixtures. However, the electrolyte solution useable in the present invention is not limited to the above examples.

The electrolyte solution may be injected in a suitable step during the manufacturing process of a battery, according to the manufacturing process and desired properties of a final product. In other words, the electrolyte solution may be injected before a battery is assembled or during a final step of the assembly process of a battery. To apply the separator of the present invention to a battery, a folding process and a lamination or stack process of the separator and the electrode may be used in addition to a general winding process.

MODE FOR INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Embodiment 1

Manufacture of Separator 5 parts by weight of butylacrylate-acrylic acid copolymer containing 5 mol % of acrylic acid unit (the butylacrylate unit has a contact angle to water of 80°, and the acrylic acid unit has a contact angle to water of 10°) was added to acetone and dissolved at 50° C. for about 12 hours to make a binder polymer solution. Electrode active material powder ($LiNi_{1/3}Mn_{1/3}CO_{1/3}O_2$) was added to the prepared binder polymer solution such that a weight ratio of binder polymer/electrode active material powder=10/90, and then the electrode active material powder was pulverized and dispersed for 12 hours or more by ball milling to make a slurry. The diameter of the electrode active material particle in the prepared slurry might be controlled according to a size (diameter) of beads used in ball milling or the time taken for the ball milling, but in this embodiment 1, the electrode active material particles were pulverized into about 600 nm to make the slurry.

The prepared slurry was used for coating a polyethylene porous film (with a porosity of 45%) having a thickness of 12 μm by means of dip coating, and a coating thickness was controlled to be about 4 μm. A pore size in the porous coating layer formed on the polyethylene porous film was in the level of 0.4 μm, and a porosity was in the level of 66%.

Preparation of Positive Electrode 92 weight % of lithium cobalt composite oxide as a positive electrode active material, 4 weight % of carbon black as a conductive material and 4 weight % of PVdF as a coupling agent were added to N-methyl-2 pyrrolidone (NMP) as a solvent to make a positive electrode active material slurry. The positive electrode active material slurry was applied to an aluminum (Al) film that is a positive electrode current collector with a thickness of 20 μm, and then dried to make a positive electrode, and then roll pressing was conducted thereto.

Manufacture of Battery

A positive electrode coin half-cell was manufactured using the positive electrode and the separator prepared as above, and then its performance was tested.

To make a battery, a Li foil, the positive electrode and the separator were assembled into a coin cell form by means of stacking, and then an electrolyte (ethylenecarbonate (EC)/ethylmethylcarbonate (EMC)=1/2 (a volume ratio), 1 mol of lithiumhexafluorophosphate ($LiPF_6$)) was injected to the assembled cell. Then, the battery performance was tested.

Embodiment 2

A separator, a positive electrode and a battery were prepared in the same way as the embodiment 1, except that acrylonitrile-acrylic acid copolymer containing 5 mol % of acrylic acid unit (the acrylonitrile unit has a contact angle to water of 85°) was used instead of butylacrylate-acrylic acid copolymer.

Embodiment 3

Manufacture of Separator

A binder polymer solution was prepared in the same way as the embodiment 1. Electrode active material powder (LTO) was added to the prepared binder polymer solution such that a weight ratio of binder polymer/electrode active material powder=10/90, and then the electrode active material powder was pulverized into 800 nm and dispersed for 12 hours or more by ball milling to make a slurry.

The prepared slurry was used for coating a polyethylene porous film having a thickness of 12 μm by means of dip coating. A coating thickness was controlled to be about 4 μm. In the embodiment 3, dip coating was used identically to the embodiment 1.

Preparation of Negative Electrode 94 weight % of LTO negative electrode active material, 3 weight % of polyvinylidenefluoride (PVdF) coupling agent and 3 weight % of carbon black conductive material were added to N-methyl-2 pyrrolidone (NMP) as a solvent to make a negative electrode active material slurry. The negative electrode active material slurry was applied to a copper (Cu) film that is a negative electrode current collector with a thickness of 10 μm, and then dried to make a negative electrode, and then roll pressing was conducted thereto.

Manufacture of Battery

A negative electrode coin half-cell was manufactured using the negative electrode and the separator prepared as above, and then its performance was tested.

To make a battery, a Li foil, the negative electrode and the separator were assembled by means of stacking, and then an electrolyte (ethylenecarbonate (EC)/ethylmethylcarbonate (EMC)=1/2 (a volume ratio), 1 mol of lithiumhexafluorophosphate ($LiPF_6$)) was injected to the assembled cell. Then, the battery performance was tested.

Comparative Example 1

A separator, a positive electrode and a battery were prepared in the same way as the embodiment 1, except that vinylidenefluoride-hexafluoropropylene copolymer containing 8 mol % of hexafluoropropylene unit (the vinylidenefluoride unit has a contact angle to water of 85°, and the hexafluoropropylene unit has a contact angle to water of 95°) was used instead of butylacrylate-acrylic acid copolymer.

Comparative Example 2

The comparative example 2 was executed in the same way as the embodiment 1, except that a butylacrylate single polymer was used instead of butylacrylate-acrylic acid copolymer.

Comparative Example 3

Batteries of comparative examples 3-1 and 3-2 were prepared in the same way as the embodiments 1 and 3, respectively, except that $BaTiO_3$ powder was used instead of the electrode active material particles used for forming a porous coating layer of a separator, and the vinylidenefluoride-hexafluoropropylene copolymer of the comparative example 1 was used as a binder polymer.

Surface Analysis of Separator

Figure 2:
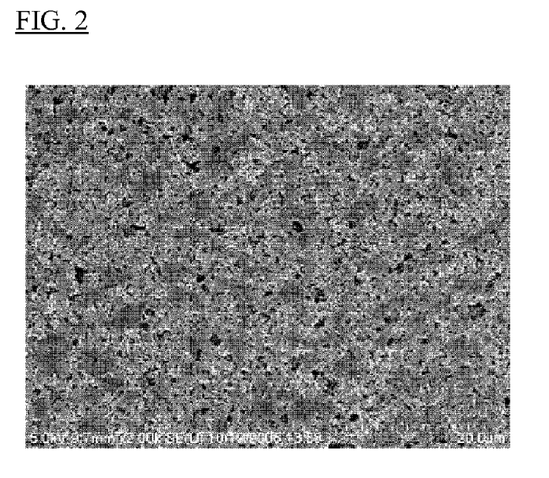
FIG. 2 is a SEM (Scanning Electron Microscope) photograph showing the separator having a porous coating layer formed thereon according to an embodiment of the present invention.

FIG. 2 is a SEM photograph showing a surface of the separator prepared according to the embodiment 1. Seeing FIG. 2, it would be found that a porous coating layer composed of electrode active material particles and a binder polymer is formed on the surface of the separator, and the electrode active material particles form a uniform pore structure.

Evaluation of Thermal Shrinkage of Separator

The separators prepared according to the embodiments 1 to 3 and the comparative example 3 were kept at 150° C. for 1 hour, and then their thermal shrinkages were evaluated. The evaluation results are listed in the following table 1.

As a result of the experiment, a separator (a control group) having a common polyolethylene porous film without a porous coating layer exhibited 80% or more thermal shrinkage, while the separator (the embodiments 1 to 3) having a porous coating layer containing electrode active material particles according to the present invention exhibited 10% or less thermal shrinkage, similarly to the separators (the comparative example 3) having a porous coating layer containing common filler particles.

TABLE 1

| Condition | Embodiment 1 | Embodiment 2 | Embodiment 3 | Control group | Comparative example 1 |
|---|---|---|---|---|---|
| Thermal shrinkage | <10% | <10% | <10% | >80% | <10% |

Evaluation of Peeling Resistance of Separator

In order to evaluate peeling resistance of the porous coating layers of the separators prepared according to the embodiments 1 and the comparative examples 1 and 3, the following evaluation was conducted. The term 'peeling force' of a porous coating layer, used herein, means a peeling force measured according to the following test.

The peeling force test was executed as follows.

A separator sample (with a width of 1.5 cm and a length of 7 cm) was fixed on a glass plate, and then a tape (a 3M transparent tape) was firmly attached to the exposed porous coating layer.

Subsequently, a tensile force measuring equipment (UTM, LLOYD LF PLUS) was used to take off the tape, and then a force required for separating the porous coating layer from the porous substrate was measured to evaluate a peeling force of the porous coating layer.

Seeing the following table 2, it would be understood that the porous coating layer of the embodiment 1 exhibits a greatly improved peeling resistance in comparison to porous coating layers of the comparative examples.

TABLE 2

| Condition | Embodiment 1 | Comparative example 1 | Comparative example 3 |
|---|---|---|---|
| Peeling force [gf/cm] | 45 | 2 | 4 |

Evaluation of Battery Performance

The batteries having positive and negative electrode capacities of 30 mAh, prepared according to the embodiments 1 and 3 and the comparative example 3 were charged by 0.5 C and then discharged by 0.5 C. The discharge capacities were listed in the following table 3. Seeing the results in the table 3, it would be understood that the separator of the embodiment in which a porous coating layer is formed using electrode active material particles exhibits an increased discharge capacity in comparison to the separators of the comparative examples in which a porous coating layer is formed using common filler particles.

TABLE 3

|  | Embodiment 1 | Comparative example 3-1 |
|---|---|---|
| Discharge capacity | 33 | 30 |
|  | Embodiment 3 | Comparative example 3-2 |
| Discharge capacity | 34 | 29 |

What is claimed is:

1. A separator, comprising:
    (a) a porous substrate having a plurality of pores; and
    (b) a porous coating layer present on at least one surface of the porous substrate, said porous coating layer, comprising:
        (i) filler particles, said filler particles comprising electrode active material particles that are electrochemically oxidized and reduced, and
        (ii) a binder polymer wherein the porous coating layer is not a positive electrode or a negative electrode.

2. The separator according to claim 1, wherein said electrode active material particles that are electrochemically oxidized and reduced comprise positive electrode active material particles, negative electrode active material particles and combinations of positive and negative electrode active material particles.

3. The separator according to claim 2, wherein said positive electrode active material particles comprise a positive electrode active material selected from the group consisting of $LiCoO_2$; $LiNiO_2$; $LiMn_2O_4$; $LiCoPO_4$; $LiFePO_4$; $LiNiMnCoO_2$; $LiNi_{1-x-y-z}Co_xM1_yM2_zO_2$, wherein M1 and M2 are independently any one selected from the group consisting of Al, Ni, Co, Fe, Mn, V, Cr, Ti, W, Ta, Mg and Mo, and x, y and z are independently atomic fractions of component elements of oxides, where $0 \leq x < 0.5$, $0 \leq y < 0.5$, $0 \leq z < 0.5$; and mixtures thereof.

4. The separator according to claim 3, wherein said positive electrode active material is $LiFePO_4$.

5. The separator according to claim 2, wherein said negative electrode active material particles comprise a negative electrode active material selected from the group consisting of natural graphite, artificial graphite, carbonaceous material, lithium titanium oxide (LTO), silicon, tin, and mixtures thereof.

6. The separator according to claim 5, wherein said negative electrode active material is LTO.

7. The separator according to claim 2, wherein said positive electrode active particles comprise $LiFePO_4$ and said negative electrode active material particles comprise lithium titanium oxide (LTO).

8. The separator according to claim 2, wherein said porous coating layer is formed on a surface of the porous substrate to face a positive electrode, and said electrode active material particles comprise positive electrode active material particles.

9. The separator according to claim 8, wherein said positive electrode active material particles comprise $LiFePO_4$.

10. The separator according to claim 2, wherein said porous coating layer is formed on a surface of the porous substrate to face a negative electrode, and said electrode active material particles comprise negative electrode active material particles.

11. The separator according to claim 10, wherein said negative electrode active material particles comprise lithium titanium oxide (LTO).

12. The separator according to claim 1,
    said porous coating layer being present on a surface of the porous substrate to face a positive electrode, and said porous coating layer being present on a surface of the porous substrate to face a negative electrode,
    wherein said electrode active material particles of said porous coating layer to face a positive electrode comprise positive electrode active material particles, and
    wherein said electrode active material particles of said porous coating layer to face a negative electrode comprise negative electrode active material particles.

13. The separator according to claim 12, wherein said positive electrode active material particles comprise $LiFePO_4$ and said negative electrode active material particles comprise lithium titanium oxide (LTO).

14. The separator according to claim 1, wherein said filler particles further comprise inorganic particles that are not electrochemically oxidized or reduced.

15. The separator according to claim 1, wherein said electrode active material particles are present in an amount of 1 to 100 weight % based on the entire weight of the filler particles.

16. The separator according to claim 15, wherein said filler particles further comprise inorganic particles that are not electrochemically oxidized or reduced.

17. The separator according to claim 15, wherein said electrode active material particles are present in an amount of 100 weight % based on the entire weight of the filler particles.

18. The separator according to claim 8, wherein said electrode active material particles are present in an amount of 1 to 100 weight % based on the entire weight of the filler particles.

19. The separator according to claim 18, wherein said filler particles further comprise inorganic particles that are not electrochemically oxidized or reduced.

20. The separator according to claim 18, wherein said electrode active material particles are present in an amount of 100 weight % based on the entire weight of the filler particles.

21. The separator according to claim 10, wherein said electrode active material particles are present in an amount of 1 to 100 weight % based on the entire weight of the filler particles.

22. The separator according to claim 21, wherein said filler particles further comprise inorganic particles that are not electrochemically oxidized or reduced.

23. The separator according to claim 21, wherein said electrode active material particles are present in an amount of 100 weight % based on the entire weight of the filler particles.

24. The separator according to claim 12, wherein said electrode active material particles are present in an amount of 1 to 100 weight % based on the entire weight of the filler particles.

25. The separator according to claim 24, wherein said filler particles further comprise inorganic particles that are not electrochemically oxidized or reduced.

26. The separator according to claim 24, wherein said electrode active material particles are present in an amount of 100 weight % based on the entire weight of the filler particles.

27. The separator according to claim 14, wherein said inorganic particles that are not electrochemically oxidized or reduced are selected from the group consisting of $BaTiO_3$, Pb(Zr,Ti)O$_3$(PZT), ZrO$_2$, SiO$_2$, Al$_2$O$_3$, TiO$_2$, lithium phosphate (Li$_3$PO$_4$) and lithium titanium phosphate (Li$_x$Ti$_y$(PO$_4$)$_3$, 0<x<2, 0<y<3).

28. The separator according to claim 1, wherein said filler particles have a size of 0.001 to 10 μm.

29. The separator according to claim 1, wherein a weight ratio of the filler particles to the binder polymer is 50:50 to 99:1.

30. The separator according to claim 1, wherein the porous coating layer has a thickness of 0.01 to 20,μm, a pore size of 0.001 to 10 μm and a porosity of 10 to 90%.

31. The separator according to claim 1,
said porous coating layer being present on a surface of the porous substrate to face a positive electrode,
wherein said electrode active material particles of said porous coating layer to face a positive electrode comprise a mixture of positive electrode active material particles and negative electrode active material particles.

32. The separator according to claim 31, wherein said electrode active material particles are present in an amount of 1 to 100 weight % based on the entire weight of the filler particles.

33. The separator according to claim 31, wherein said electrode active material particles are present in an amount of 100 weight % based on the entire weight of the filler particles.

34. The separator according to claim 31, wherein said positive electrode active material particles comprise LiFePO$_4$ and said negative electrode active material particles comprise lithium titanium oxide (LTO).

35. The separator according to claim 1,
said porous coating layer being present on a surface of the porous substrate to face a negative electrode,
wherein said electrode active material particles of said porous coating layer to face a negative electrode comprise a mixture of positive electrode active material particles and negative electrode active material particles.

36. The separator according to claim 35, wherein said electrode active material particles are present in an amount of 1 to 100 weight % based on the entire weight of the filler particles.

37. The separator according to claim 35, wherein said electrode active material particles are present in an amount of 100 weight % based on the entire weight of the filler particles.

38. The separator according to claim 35, wherein said positive electrode active material particles comprise LiFePO$_4$ and said negative electrode active material particles comprise lithium titanium oxide (LTO).

39. The separator according to claim 1,
said porous coating layer being present on a surface of the porous substrate to face a positive electrode and on a surface of the porous substrate to face a negative electrode,
wherein said electrode active material particles of said porous coating layer to face a positive electrode comprise a mixture of positive electrode active material particles and negative electrode active material particles, and
wherein said electrode active material particles of said porous coating layer to face a negative electrode comprise a mixture of positive electrode active material particles and negative electrode active material particles.

40. The separator according to claim 39, wherein said electrode active material particles are present in an amount of 1 to 100 weight % based on the entire weight of the filler particles.

41. The separator according to claim 39, wherein said electrode active material particles are present in an amount of 100 weight % based on the entire weight of the filler particles.

42. The separator according to claim 39, wherein said positive electrode active material particles comprise LiFePO$_4$ and said negative electrode active material particles comprise lithium titanium oxide (LTO).

43. An electrochemical device, comprising:
a positive electrode,
a negative electrode,
a separator according to claim 1 and
an electrolyte interposed between the positive electrode and the negative electrode.

44. The electrochemical device according to claim 43, wherein the electrochemical device is a lithium secondary battery.

* * * * *